US011221691B2

(12) United States Patent
Chung et al.

(10) Patent No.: US 11,221,691 B2
(45) Date of Patent: Jan. 11, 2022

(54) METHOD AND A DEVICE FOR INTERACTING WITH A TOUCH SENSITIVE SURFACE

(71) Applicant: Animae Technologies Limited, New Territories (HK)

(72) Inventors: Wai Lung David Chung, New Territories (HK); Hiu Kwan Lam, New Territories (HK)

(73) Assignee: Animae Technologies Limited, New Territories (HK)

( * ) Notice: Subject to any disclaimer, the term of this patent is extended or adjusted under 35 U.S.C. 154(b) by 633 days.

(21) Appl. No.: 16/094,231

(22) PCT Filed: May 11, 2018

(86) PCT No.: PCT/CN2018/086524
§ 371 (c)(1),
(2) Date: Oct. 17, 2018

(87) PCT Pub. No.: WO2018/206000
PCT Pub. Date: Nov. 15, 2018

(65) Prior Publication Data
US 2021/0240287 A1  Aug. 5, 2021

(30) Foreign Application Priority Data
May 12, 2017 (HK) .................. 17104801.2

(51) Int. Cl.
*G06F 3/039* (2013.01)
*G06F 3/041* (2006.01)
*G06F 3/044* (2006.01)

(52) U.S. Cl.
CPC ............ *G06F 3/0393* (2019.05); *G06F 3/044* (2013.01); *G06F 3/0418* (2013.01); *G06F 3/04162* (2019.05); *G06F 2203/04101* (2013.01); *G06F 2203/04104* (2013.01)

(58) Field of Classification Search
CPC .... G06F 3/044; G06F 3/04162; G06F 3/0418; G06F 2203/04101; G06F 2203/04104
See application file for complete search history.

(56) References Cited

U.S. PATENT DOCUMENTS

| 2003/0044069 A1* | 3/2003 | Ku | G06K 9/222 382/187 |
| 2012/0169640 A1 | 7/2012 | Lin | |
| 2015/0149968 A1 | 5/2015 | Sun | |
| 2016/0026281 A1* | 1/2016 | Wu | G06F 1/169 345/173 |

FOREIGN PATENT DOCUMENTS

CN  103135876  6/2013

* cited by examiner

*Primary Examiner* — Lisa S Landis
(74) *Attorney, Agent, or Firm* — Renner Kenner Greive Bobak Taylor & Weber

(57) ABSTRACT

A method and a device for interacting with a touch sensitive surface includes a trigger and a contact point area associated with the touch sensitive surface; wherein the trigger is adapted to activate and/or deactivate one or more dynamic contact points defined within or adjacent to the contact point area to simulate one or more touch action of the touch sensitive surface.

32 Claims, 12 Drawing Sheets

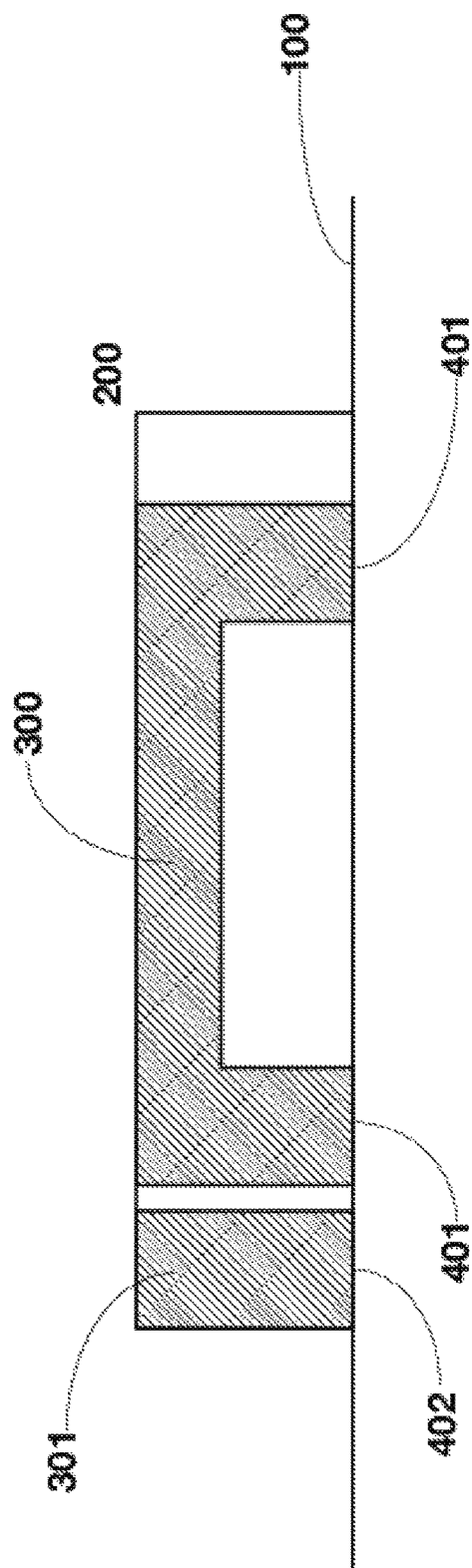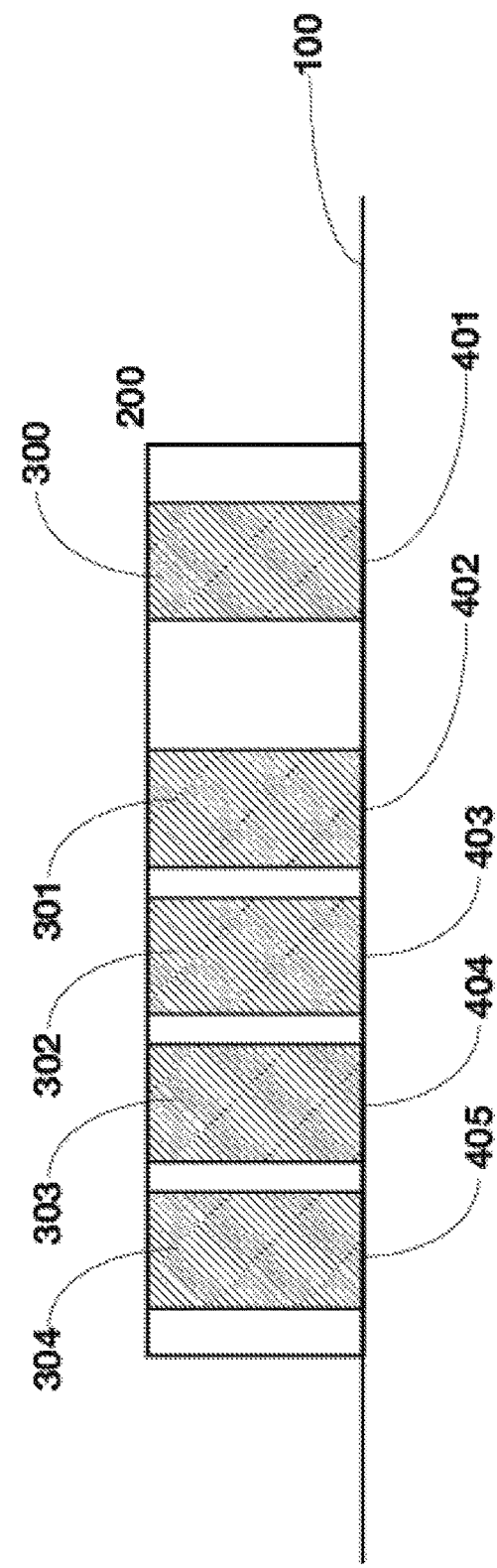
FIG. 19
FIG. 20

METHOD AND A DEVICE FOR INTERACTING WITH A TOUCH SENSITIVE SURFACE

TECHNICAL FIELD

The invention relates a method and a device for interacting with a touch sensitive surface, in particular a method, a system, or a device of interacting touch-sensitive surfaces using one or more objects with dielectric and/or conductive materials.

BACKGROUND

Electronic interface device is an essential computer peripheral. One of the most important electronic interface devices is the pointing device, such as a mouse, used in a desktop environment. Traditionally, this type of tangible user interface device is connected to a computer with a special connector such as PS/2 or USB.

Touch-sensitive device or touch panel is another example of a user interface device. A touch panel may include a sensing region, often demarked by a surface, in which the touch panel determines the presence, location and/or motion of one or more input objects.

Capacitive input devices may be used as touch input devices for handheld computing system, and may also be used in larger computing systems taking over tradition pointing devices as the standard input/output peripherals.

However, capacitive input devices are ubiquitous in smaller computing systems and consumer devices. For example, touch screen input devices are typically superimposed upon or otherwise collocated with a display screen of other electronic system.

The capacitive input devices were first developed to allow single touch point. Later they were developed to allow multi-touch interface. In a multi-touch device, a user has an ability to interact with applications by touching the multi-touch device at multiple points simultaneously with pointed objects such as the user's fingers or a pointer. The user may move the pointed object across the multi-touch device or tap on the multi touch device to generate different gesture style signal. The application responds accordingly to the gesture motions performed by the user.

Capacitive input devices do not use the pressure of an object to create a change in the flow of electricity in order to generate signals. Instead, capacitive input devices sense an electrical charge of an object to generate signals. Therefore, capacitive input devices are constructed from materials that store electrical charges in an electrostatic grid of tiny wires. Hence, only special designed tangible user interfaces can work with capacitive input devices.

SUMMARY OF THE INVENTION

It is, therefore, an object of the present invention to provide a system, a device and a method of interacting touch-sensitive surfaces using one or more objects with dielectric and/or conductive materials.

Other objects and advantages will become apparent when taken into consideration with the following specification and drawings.

It is also an object of the present invention to overcome or ameliorate at least one of the disadvantages of the prior art, or to provide a useful alternative.

In accordance with a first aspect of the present invention, there is provided an electronic interface device for interacting with a touch sensitive surface, comprising a trigger and a contact point area associated with the touch sensitive surface; wherein the trigger is adapted to activate and/or deactivate one or more dynamic contact points defined within or adjacent to the contact point area to simulate one or more touch action of the touch sensitive surface.

In an embodiment of the first aspect, the one or more dynamic contact points defines a pattern.

In an embodiment of the first aspect, the one or more dynamic contact points comprise at least an individual contact point and a primary contact point.

In an embodiment of the first aspect, the one or more dynamic contact points further comprise at least two neighboring contact points.

In an embodiment of the first aspect, the at least two neighboring contact points include the primary contact point and at least one secondary contact point.

In an embodiment of the first aspect, the trigger is associated with the contact point area through a bridge.

In an embodiment of the first aspect, the trigger includes a first trigger in connection with a first contact point area, wherein the first trigger is adapted to receive a first trigger signal so as to activate the individual contact point within the first contact point area.

In an embodiment of the first aspect, the first trigger is further arranged to active the primary contact point within the first contact point area.

In an embodiment of the first aspect, the trigger further includes a second trigger in connection with a second contact point area, wherein the second trigger is adapted to receive a second trigger signal so as to move the primary contact point to the secondary contact point within or adjacent to the second contact point area.

In an embodiment of the first aspect, the trigger further includes a second trigger in connection with a second contact point area, wherein the second trigger is adapted to receive a second trigger signal so as to activate the primary contact point within the second contact point area.

In an embodiment of the first aspect, the second trigger is further arranged to move the primary contact point to the secondary contact point within or adjacent to the second contact point area.

In an embodiment of the first aspect, the contact point area is defined with different shapes and/or patterns.

In an embodiment of the first aspect, the contact point area includes a plurality of subsidiary contact point areas.

In an embodiment of the first aspect, the trigger is further arranged to activate the one or more dynamic contact points to define a swipe movement on the plurality of subsidiary contact point areas in response to a swiping touch signal received by trigger associated with the plurality of subsidiary contact point areas.

In an embodiment of the first aspect, the trigger is arranged to activate a plurality of dynamic contact points on each of the plurality of subsidiary contact point areas.

In an embodiment of the first aspect, the trigger is arranged to activate a combined dynamic contact point within or adjacent to one or more of the plurality of subsidiary contact point areas.

In an embodiment of the first aspect, the trigger is arranged to selectively connect to the touch sensitive surface.

In an embodiment of the first aspect, the device further comprises a processor for processing the signals of the trigger and controlling the contact point area.

In an embodiment of the first aspect, the trigger is adapted to reset one or more contact points on the contact point area.

In an embodiment of the first aspect, the touch sensitive surface comprises a capacitive material or conductor.

In an embodiment of the first aspect, the touch sensitive surface arranged to electrically communicate with the trigger.

In an embodiment of the first aspect, the trigger is adapted to activate the one or more dynamic contact points in response to receiving a touch signal.

In an embodiment of the first aspect, a contact point is activated by inducing a current to the capacitive material or conductor of the contact point.

In an embodiment of the first aspect, a contact point is deactivated by cancelling the current induced on the capacitive material or conductor of the contact point.

In an embodiment of the first aspect, the one or more touch action includes at least one of a dial, a swipe, a scroll, a press, a tap and a click action.

In an embodiment of the first aspect, the electronic interface device includes a tangible interface associated with an intangible interface defined on the touch sensitive surface.

In accordance with a second aspect of the present invention, there is provided a method for interacting with a touch sensitive surface, comprising the steps of: defining a contact point area associated with the touch sensitive surface, wherein the contact point area connected to a trigger; receiving a trigger signal by the trigger; and activating and/or deactivating one or more dynamic contact points defined within or adjacent to the contact point area to simulate one or more touch action of the touch sensitive surface.

In an embodiment of the second aspect, the one or more dynamic contact points defines a pattern.

In an embodiment of the second aspect, the one or more dynamic contact points comprise at least an individual contact point and a primary contact point.

In an embodiment of the second aspect, the one or more dynamic contact points further comprise at least two neighboring contact points.

In an embodiment of the second aspect, the at least two neighboring contact points includes the primary contact point and at least one secondary contact points.

In an embodiment of the second aspect, the trigger is associated with the contact point area through a bridge.

In an embodiment of the second aspect, the method further comprises the step of receiving a first trigger signal on a first trigger so as to activate the individual contact point within a first contact point area; wherein the trigger includes the first trigger in connection with the first contact point area.

In an embodiment of the second aspect, the method further comprises the step of activating the primary contact point within the first contact point area upon receiving the first trigger signal on the first trigger.

In an embodiment of the second aspect, the method further comprises the step of receiving a second trigger signal on a second trigger so as to move the primary contact point to the secondary contact point within or adjacent to the second contact point area; wherein the trigger includes the second trigger in connection with the second contact point area.

In an embodiment of the second aspect, the method further comprises the step of receiving a second trigger signal on a second trigger so as to activate the primary contact point within the second contact point area; wherein the trigger includes the second trigger in connection with the second contact point area.

In an embodiment of the second aspect, the method further comprises the step of moving the primary contact point to the secondary contact point within or adjacent to the second contact point area.

In an embodiment of the second aspect, the contact point area is defined with different shapes and/or patterns.

In an embodiment of the second aspect, the contact point area includes a plurality of subsidiary contact point areas.

In an embodiment of the second aspect, the method further comprises the step of activating the one or more dynamic contact points to define a swipe movement on the plurality of subsidiary contact point areas in response to a swiping touch signal received by trigger associated with the plurality of subsidiary contact point areas.

In an embodiment of the second aspect, the method further comprises the step of activating a plurality of dynamic contact points on each of the plurality of subsidiary contact point areas.

In an embodiment of the second aspect, the method further comprises the step of activating a combined dynamic contact point within or adjacent to one or more of the plurality of subsidiary contact point areas.

In an embodiment of the second aspect, the one or more touch action includes at least one of a dial, a swipe, a scroll, a press, a tap and a click action.

In an embodiment of the second aspect, the method further comprises the step of providing the trigger on a tangible interface associated with an intangible interface defined on the touch sensitive surface.

In an embodiment of the second aspect, the method further comprises the step of selectively connect the trigger to the touch sensitive surface.

In accordance with a third aspect of the present invention, there is provided a method of verifying an interaction on a touch sensitive surface, comprising the steps of: detecting a dynamically generated individual contact point and a dynamically generated primary contact point; evaluating a distance of the individual contact point and the primary contact point; evaluating one or more of angles, orientations, alignment of a line formed by of the individual contact point and the primary contact point; and thereby determining a general identity of a touch action.

In an embodiment of the third aspect, the method further comprises the step of: detecting a dynamically generated secondary contact point, and evaluating one or more of distances, angles, orientations, alignment of a line formed by of the individual contact point, the primary contact point and the secondary contact point; and thereby determining a specific identity of the touch action.

In an embodiment of the third aspect, the step of determining the identity of the touch action comprises the step of: searching an identity database for a referencing identity which matches one or more of the distance, angles, orientations and alignment of a line formed by of the individual contact point, the primary contact point and/or a secondary contact point.

In an embodiment of the third aspect, the one or more contact points are dynamically generated by an electronic device including the touch sensitive surface according to the first aspect.

In accordance with a fourth aspect of the present invention, there is provided a computing system comprising a touch sensitive device adapted to carry out a method according to any one of the second or the third aspect.

In accordance with a fifth aspect of the present invention, there is provided interface device for interacting with an electronic computing device having a touch sensitive surface, comprising: a contact point area including a first contact point area and a second contact point area; a trigger including a first trigger and a second trigger in electrical communication respectively with the first contact point area and the second contact point area; wherein the trigger is adapted to activate and/or deactivate one or more dynamic contact points defined within or adjacent to the contact point area to simulate one or more touch action of the touch sensitive surface in contact with the contact point area; wherein the one or more dynamic contact points include at least an individual contact point and a primary contact point, the primary contact point is further arranged to move to a secondary contact point during an interaction process; and wherein the electronic computing device is arranged to determine the touch action by processing a movement of the primary contact point and/or the secondary contact point with respect to the individual contact point on the touch sensitive surface.

BRIEF DESCRIPTION OF THE DRAWINGS

Embodiments of the present invention will now be described, by way of example, with reference to the accompanying drawings in which:

FIG. 19 is a side view of the electronic interface device of FIG. 1, wherein the electronic interface device is placed on a touch sensitive surface;

FIG. 20 is a side view of an electronic interface device in accordance with an alternative embodiment of the present invention.

DETAILED DESCRIPTION OF THE PREFERRED EMBODIMENT

The present invention relates to a device, system or a method of interacting touch-sensitive surfaces such as capacitive sensing surface using one or more tangible user interface (TUI) device with dielectric and/or conductive materials.

In one example embodiment, there is provided a multi-touch screen interface tool with object recognition capabilities. The interface tools involved an implemented method having the steps for tracking, on a multi-touch device, at least one interactive object having an asymmetrical pattern of contacts located on a surface of the interactive object. A signal would then be received when the interactive object interacted with an interactive screen of the multi-touch device. The interactive object could be identified using the asymmetrical pattern of contacts located on the surface of the interactive object, where the asymmetrical pattern of contacts represented a pattern specific to the interactive object. The asymmetrical pattern of contacts could be examined to determine a state of the interactive object. The multi-touch device could be synchronized based on the state of the interactive object represented by the asymmetrical pattern of contacts.

In another example, there is provided a simulation component that interacted with a user to provide an educational experience. The simulation component identified attributes of the objects manipulated by the user to conduct the simulation. The attributes identified by the simulation component included physical attributes, and logical attributes such as the shape, weight, orientation, and constituent materials of the objects. The simulation component responded to the user based on the identities and physical attributes of the objects. These responses might include a variety of sensory output, such as audio output, visual output, and tactile output. The simulation component executed by the at least one processor and configured to detect a manipulation of the object disposed on the touch screen, determine a degree of compliance of the manipulation to rules of the at least one simulation; and communicate a characterization of the degree of compliance to an external entity.

In yet another example embodiment, there is provided a system that facilitates recognition of an engagement between an object and a touch screen in the absence of human contact. Upon the engagement, an electrically conductive path can be established that extends from a surface of the touch screen such that sufficient electrons flow from the touch screen through the electrically conductive path to enable the recognition of the object on the touch screen in the absence of human contact with the object during continued presence of the object on the touch screen.

However, none of these example device or method provides a new type of tangible user interface (TUI) device, system or method that allows a user to manipulate the TUI device to simulate different object identities in real time.

Figure 1:
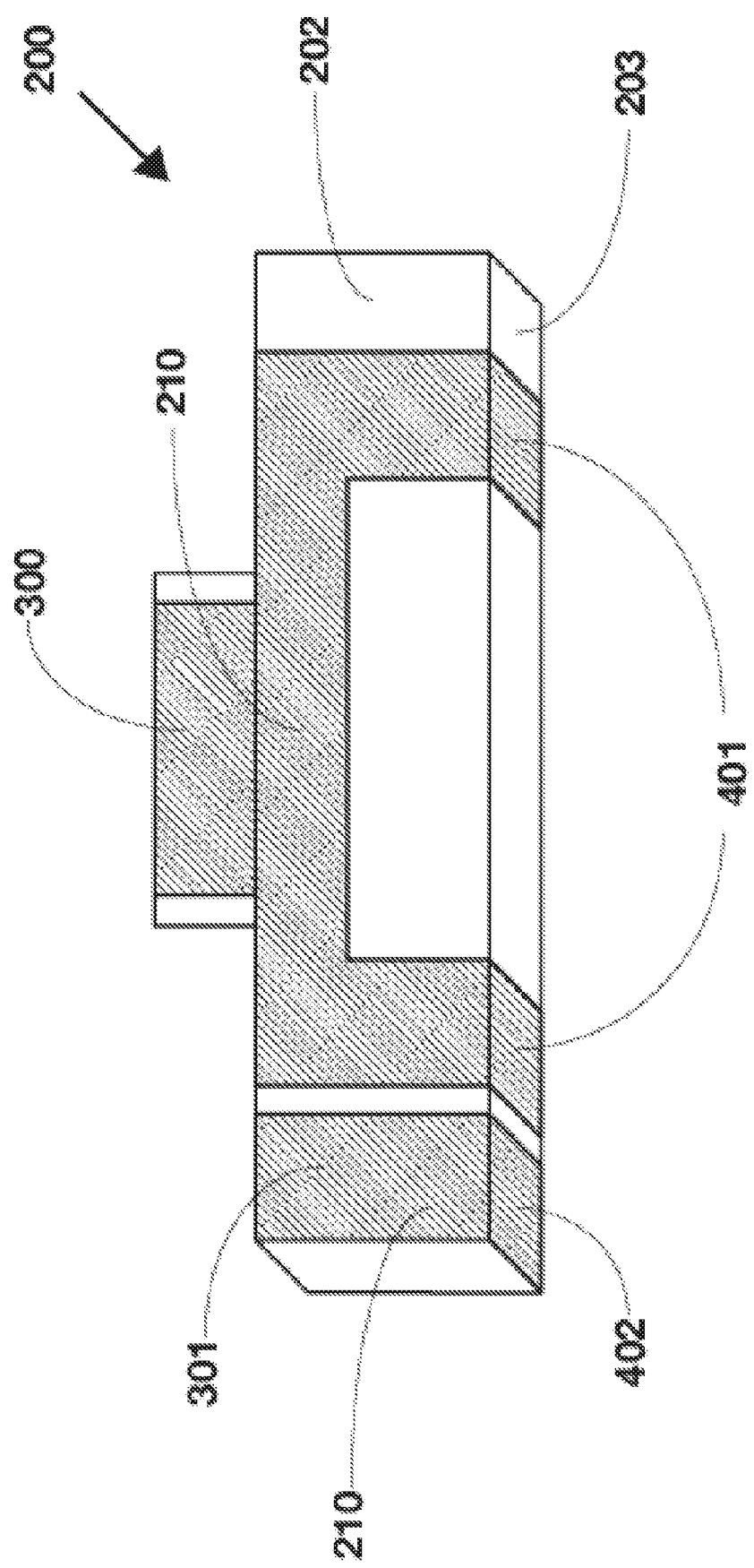
FIG. 1 is a perspective view of an electronic interface device in accordance with an embodiment of the present invention.

With reference to FIG. 1, there is shown an embodiment of an electronic interface device 200 for interacting with a touch sensitive surface (not shown), comprising a trigger 300/301 associated with a contact point area defined on the touch sensitive surface; wherein the trigger 300/301 is adapted to activate and/or deactivate one or more dynamic contact points defined within or adjacent to the contact point area 401/402 to simulate one or more touch action of the touch sensitive surface.

In this embodiment, the electronic interface device 200 comprises a block structure with difference surfaces, including at least a side surface 202 and a bottom surface 203. Electrically conductive materials 210 may be deposited on one or more surfaces of the electronic interface device 200, preferably in predetermined patterns in which the conductive materials 210 may electrically connects different parts of surfaces of the electronic interface device 200. Preferably, one or more portions of the conductive material/pattern define the trigger 300/301 which may be touch by a user.

Referring to FIG. 1, the trigger may include at least a first trigger 300 and a second trigger 301. The first and the second trigger may be electrically disconnected such that the first trigger 300 and the second trigger 301 may receive separate trigger signals. For example, a user may selectively touch the first trigger 300 or the second trigger 301 provided on the side surface so as to provide a trigger signals to the first or second trigger via the conductive material.

Preferably, the trigger may be provided external from the touch sensitive surface, and the trigger is arranged to selectively connect to the touch sensitive surface. When the electronic interface device 200 is placed on a touch sensitive device such as a touch panel of a tablet computer, the contact point areas 401/402 are in contact with the touch panel therefore touch/trigger signals may be transmitted to the touch panel via the conductive material, which may in turn define one or more touch interactions on the touch panel.

The abovementioned interaction may be similar to touching a touch panel of a tablet computer directly with fingers or touch pen, however the electronic interface device 200 may allow the user to interact with the touch panel with a tangible interface which may be provided on one or more surfaces of the electronic interface device 200. Accordingly, the electronic interface device 200 may include a tangible interface associated with an intangible interface defined on the touch sensitive surface, in which the user may understand and interact with the tangible interface such as "buttons" defined on the surfaces of the electronic interface device 200, however the association between the intangible interface defined on the touch sensitive surface and the tangible interface may be unknown to the user. In the following disclosures, the electronic interface device 200 may also be referred as a tangible user interface (TUI) device.

In one example operation, the electronic interface device 200 may be placed on a touch sensitive surface with the bottom surface 203 in direct contact with the touch sensitive surface, such that the touch sensitive surface may electrically communicate with the triggers 300/301 of the electronic interface device 200. A user may hold the electronic interface device 200 with a right hand such that the right thumb may touch the first trigger 300 on the side surface 202, therefore generating a first trigger signal at the first contact point area 401 at the bottom surface of the electronic interface device 200 via the conductive material 210. Optionally, the user may touch the second trigger 301 on the side surface or the top surface so as to generate a second trigger signal at the second contact point area 402 at the bottom surface 203. These touch signals may be detected by the touch sensitive surface which may be recognized as touch points or contact points on the touch sensitive surface. The relative positions of the first contact point area 401 and the second contact point area may correspond to the contact points 1/2 and 4 respectively in the examples with reference to FIGS. 2 to 3, in which the dynamic contact point may be defined within or adjacent to each of the first and the second contact point areas.

Figure 3:
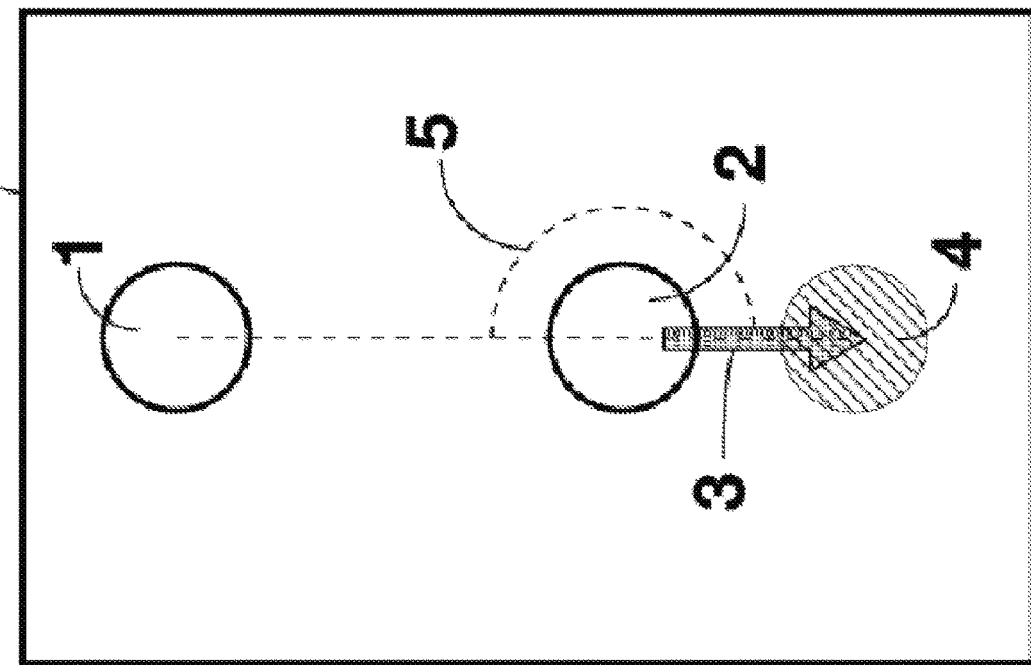
FIG. 3 is a schematic diagram showing another step in the process of verifying an object according to an embodiment of the present invention.
Figure 2:
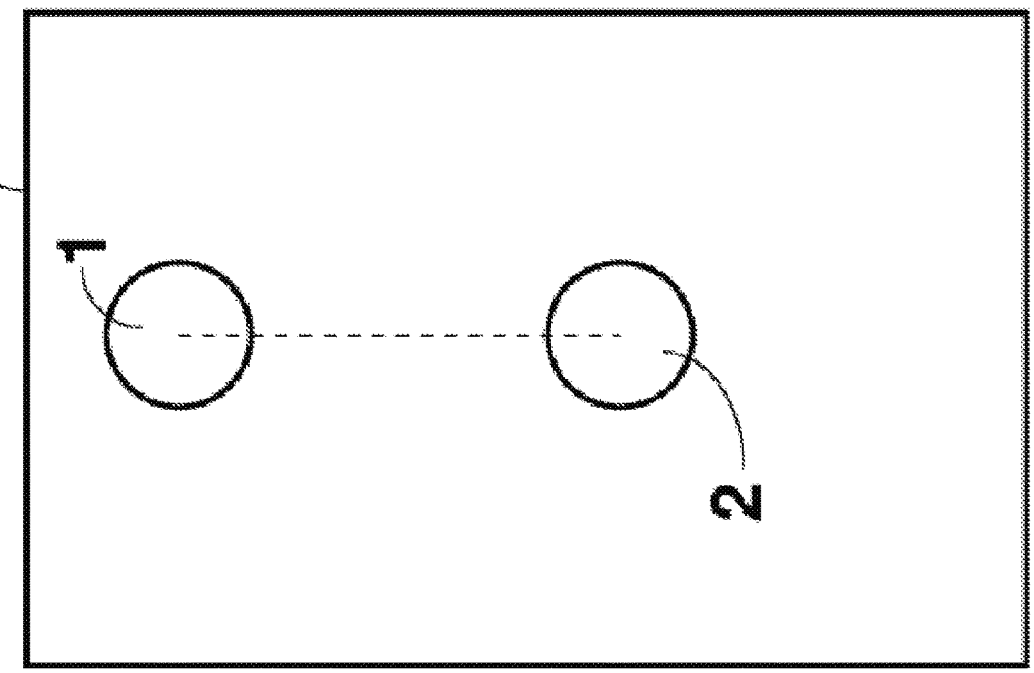
FIG. 2 is a schematic diagram showing a step in the process of verifying an object according to an embodiment of the present invention.

Referring to FIGS. 2 to 3, there is provided an embodiment of method for interacting with a touch sensitive surface, comprising the steps of: defining a contact point area on the touch sensitive surface 100, wherein the contact point area is associated with a trigger; receiving a trigger signal by the trigger; and activating and/or deactivating one or more dynamic contact points (1, 2, 4) defined within or adjacent to the contact point area to simulate one or more touch action of the touch sensitive surface 100.

In this embodiment, the touch sensitive surface 100 may be provided on an electronic interface device 200 such as a touch-sensitive input device or a touch module on touch-enabled computing device (e.g. a smartphone or a tablet computer). The touch sensitive surface 100 may be arranged to convert a physical touch signal on the surface to an electrical signal having a plurality of parameters such as an existence and a number of the physical touch(es), coordinates of the touch on the touch surface, pressure of each of the touches, etc.

Preferably, virtual contact points or "buttons" may be dynamically defined on the touch sensitive surface which allows user to "actuate". For example, typical "buttons" such as "home", "menu" and "back" may be virtually and selectively defined and display on a touch screen of a smartphone. A user may tap or press the virtual buttons by clicking, tapping or pressing the touch screen on these predetermined coordinates or areas on the touch panel, and the touch input device may verify the touch signal received so as to perform the associated function.

Preferably, the dynamic contact points may define a pattern. The pattern may include a number of contact points. For example, a user may interact with the touch input device with different touch action, including swiping on the surface to create a trace of touch points, which may in turns validated as unlocking the lock screen of the device or scrolling a webpage on a browser.

Other user interactions may also include, but not limited to, control, dial, swipe, scroll and button clicks, data input, manipulating and symbolizing gestures, identification, verification and authentication.

The movement of a touch point may generate both analogue and digital signals. Analogue signal may represent continuous value input generated by continuous touch signal, and digital signal may represent discrete value input generated by discrete touch signal.

Preferably, the dynamic contact points may be selectively activated. Referring to FIG. 2, the dynamic contact points 1 and 2 may be activated or enabled in response to user interaction on the electronic interface device 200. For example, a user may touch a first trigger so as to activate the individual contact point 1 within a first contact point area, and the user may subsequently touch a second trigger which may activate a primary contact point 2 within a second contact point area. In addition, the user may activate a secondary contact point 4 by moving the touch interaction of the second trigger, so as to move the contact point 2 to the contact point 4.

Alternatively, the dynamic contact points 1 and 2 may be simultaneously activated by the first trigger which includes two subsidiary contact point areas to define the individual contact point 1 and the primary contact point 2. The user may activate the secondary contact point 4 by touching a second trigger which is associated with a second contact point area adjacent to first contact point area which may define the primary contact point 1, and thus generating a combined dynamic contact point between the two contact points or adjacent to the second contact point area, thus moving the primary contact point 2 to the secondary contact point 4.

The trigger and contact points may also represent different interactions (such as a touch gesture) in different applications. With reference to FIGS. 2 to 5, there is shown an example verification process of a TUI device of an embodiment of the present invention.

Referring to FIG. 2, the individual contact point 1 and primary contact point 2 on the TUI device are activated and in contact with the touch-sensitive surface 100 to generate first touch point 1 and second touch point 2 on the touch sensitive surface.

The touch sensitive surface or the device carried out calculations of distance and angle between the first touch point 1 and the second touch point 2 determine the position, orientation, alignment and general identity of an object.

Referring to FIG. 3, a directional arrow 3 represents a move of touch point 2 to a new position 4, when a secondary contact point 4 is activated and in contact with the touch-sensitive surface 100. Calculation of the change of position of the second touch point 2, the angle 5 from the first touch point 1, last position and current position 4 of second touch point 2 further determine the pointing direction of the touch action and its unique/specific identity.

Preferably, the one or more dynamic contact points further comprise at least two neighboring contact points, and the neighboring contact points include at least the primary contact point and at least one secondary contact points. For example, the individual contact point 1 is activated in response to a touch action of the first trigger, the primary contact point 2 may also be activated by the same touch of the first trigger or a different touch of a second trigger. Subsequently, the neighbouring secondary contact points 4 may be activated as described earlier which allow the user to move the touch action from primary contact point 2 to secondary contact point 4. Optionally, multiple and more than two sets of neighbouring contact points 2/4 as illustrated on both FIGS. 3 and 5 may be activated.

The at least two neighboring contact points may be positioned proximate or adjacent to each other. In some touch sensitive surfaces such as capacitive touch screen or panel, a touch signal at two neighboring contact points may generate or may be recognized as a single touch point on the touch sensitive surface. In this example, the touch signal may generate a combined touch point which is substantially positioned at a mid-point between the two neighbouring contact points.

Alternatively, one or more of the neighboring contact points may be place sufficiently apart from each other such that touching/activating these contact points may be recognized as multiple contact points on the touch sensitive surface.

Preferably, the moving of the touch point may be a result of a detection of a "combined touch" of two neighboring contact points. For example, the detection of a touch on the contact point 2 will "move" to the contact point 4 when an additional touch is provided on a neighboring contact point adjacent to the contact point 4. Alternatively, separate touch points 2 and 4 may be detected and processed based on the different arrangements of the touch sensitive surface and the electronic interface device 200.

Figure 5:
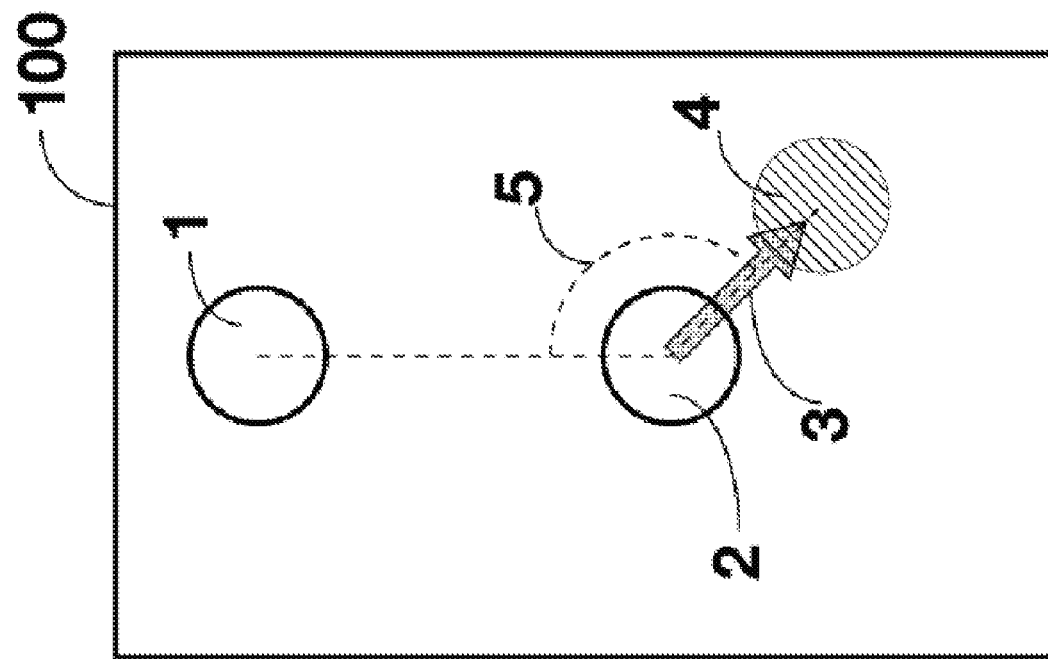
FIG. 5 is a schematic diagram showing another step in the process of verifying an object according to an embodiment of the present invention.
Figure 4:
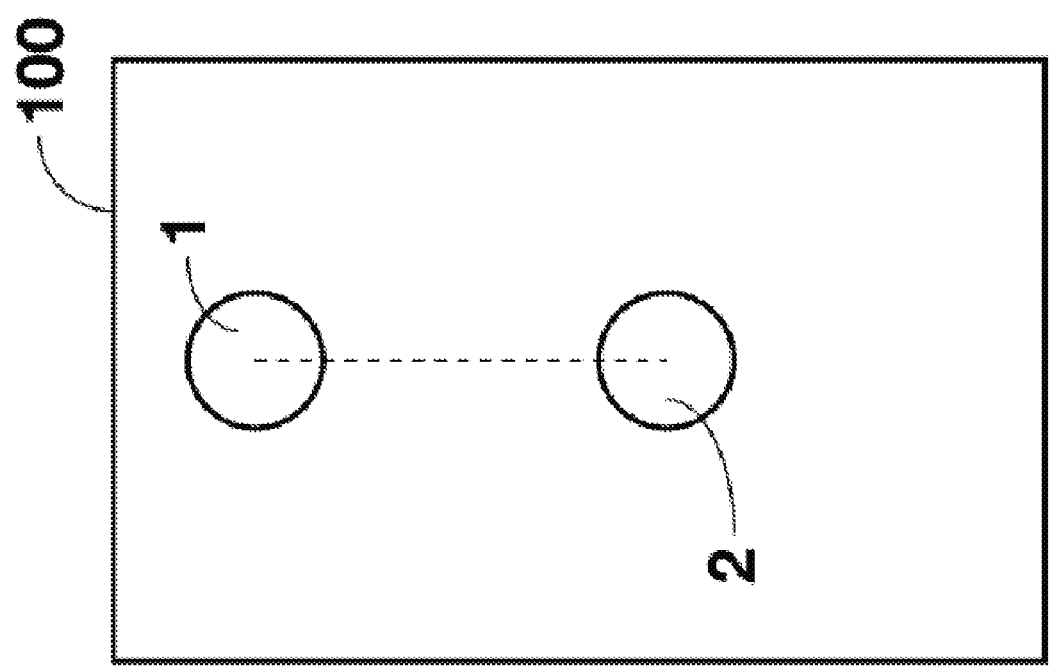
FIG. 4 is a schematic diagram showing another step in the process of verifying an object according to an embodiment of the present invention.

With reference to FIGS. 4 and 5, there is shown another example of verification process of a TUI device of an embodiment of the present invention.

FIG. 4 is same as FIG. 2. The individual contact point 1 is touched and primary contact point 2 on the TUI device is activated and in contact with the touch-sensitive surface 100 to generate first touch point 1 and second touch point 2 on the touch sensitive surface.

Referring to FIG. 5, a different directional arrow 3 represents a move of the second touch point 2 to a new position 4 which is different from that shown in FIG. 3, when a third contact point 4 is activated and in contact with the touch-sensitive surface 100. In this example, the specific identity of the touch action may be determined as different from the one in the previous example referring to FIG. 3, since the position of the contact point 4 is determined to be different from that the previous example.

In these two examples, the associated electronic interface devices 200A and 200B each may comprise a bottom surface having different shapes or patterns of the conductive material defined, i.e. the positions of the second trigger may be different so as to activate different contact points 4 with reference to FIGS. 3 and 5 respectively.

Figure 6:
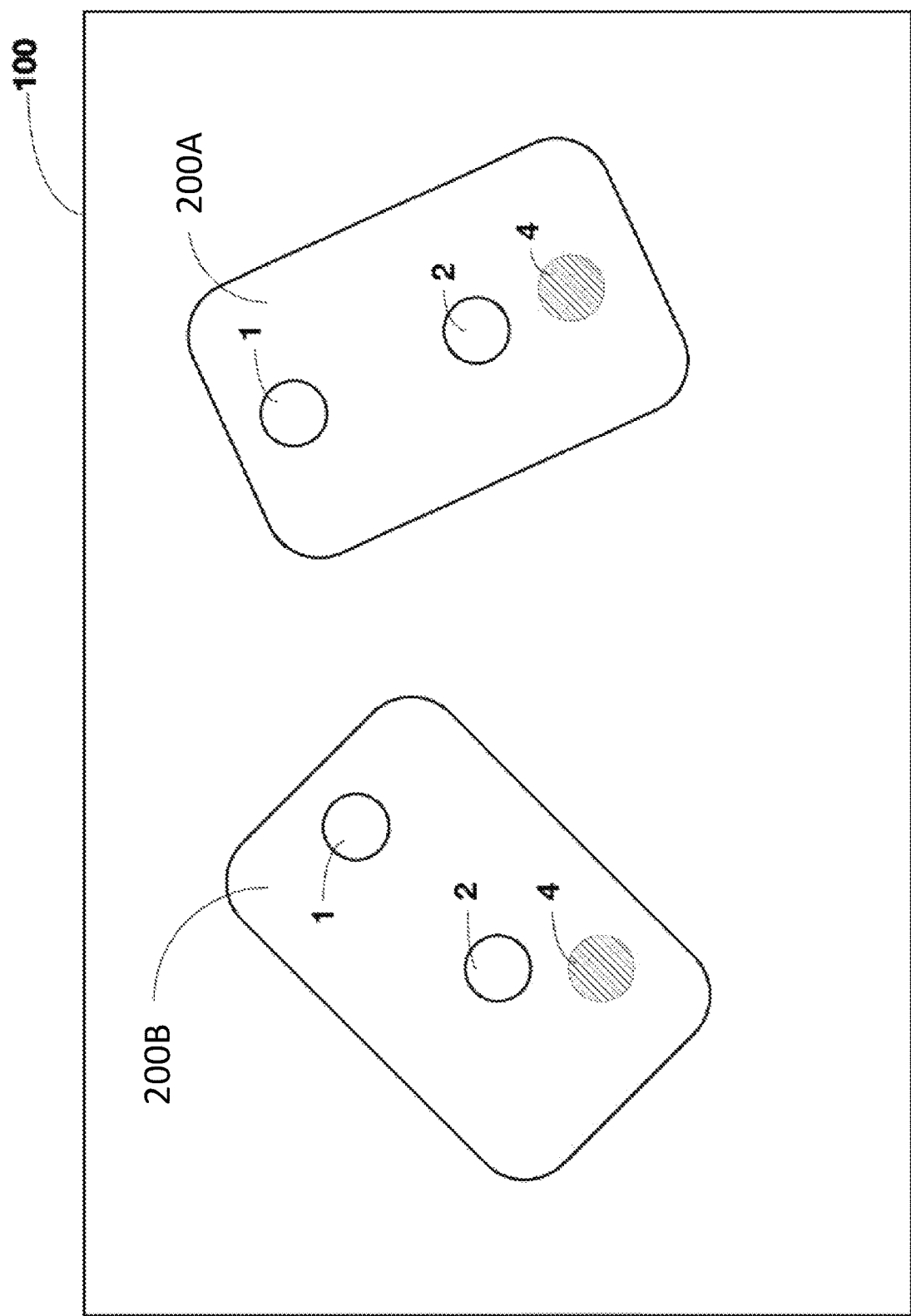
FIG. 6 is a schematic diagram showing a device of an embodiment of the present invention representing two different objects.

With reference to FIG. 6, there is shown an example embodiment of a TUI device 100 defined with two individual objects 200A and 200B. In this example, each of the objects is defined with different arrangement of touch points 1, 2 and 4 which is similar to the previous examples. Preferably, objects 200A and 200B represent different items with different identities on the same touch-sensitive surface 100.

In this example, two different electronic interface devices 200 may be placed on the touch sensitive surface 100 so as to define the two different objects with different identities. Alternatively or optionally, two or more electronic interface devices 200 that may include different or same configurations may be placed on the touch sensitive surface according to different requirements.

Figure 8:
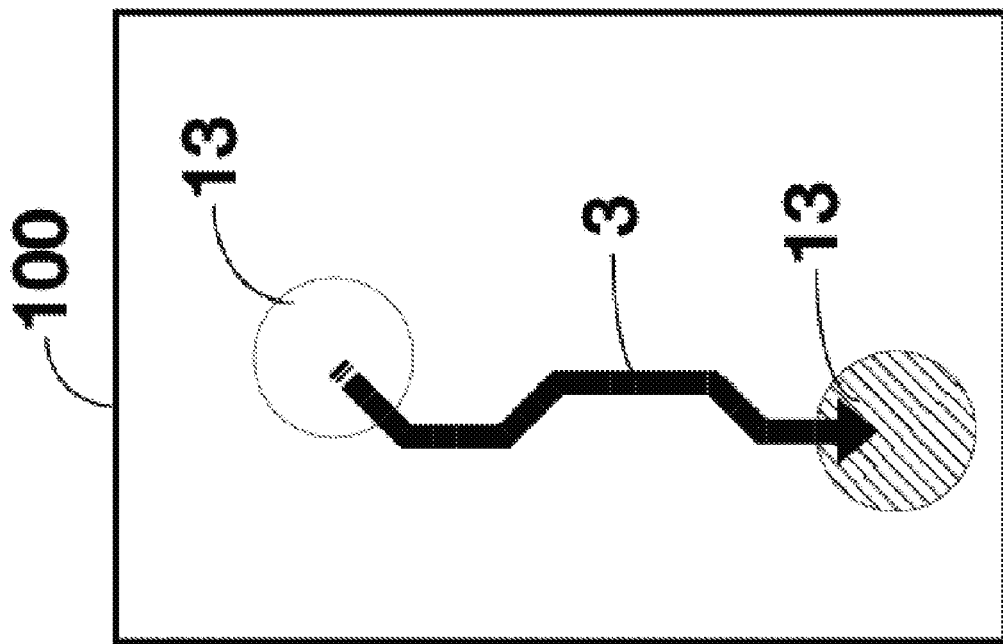
FIG. 8 is a schematic diagram showing yet another step in the process of verifying an object according to an embodiment of the present invention.
Figure 7:
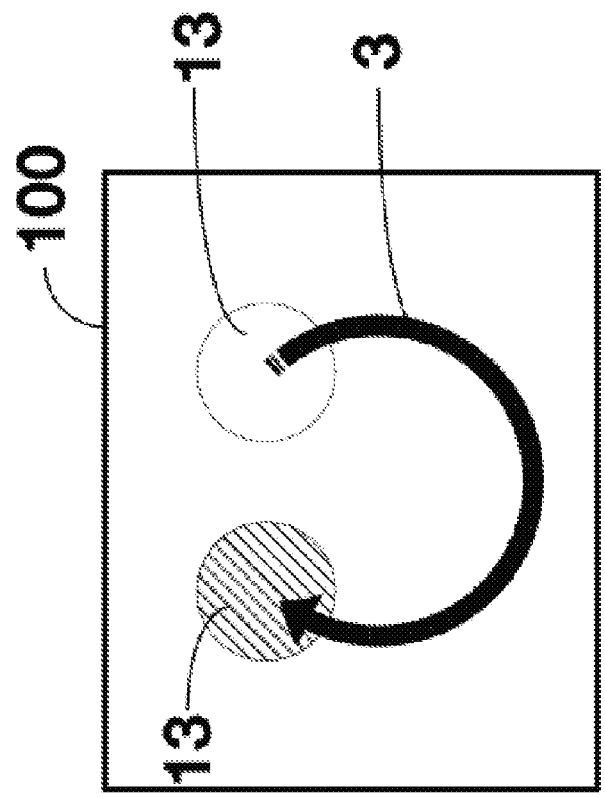
FIG. 7 is a schematic diagram showing another step in the process of verifying an object according to an embodiment of the present invention.

In some other examples, the trace or the path of the dynamic contact points may not necessarily in a single straight line. With reference to FIGS. 7 and 8, there is shown directional arrows 3 representing a subsequent move of a touch point 13 in a different path or pattern on the touch-sensitive surface 100, which include a substantially circular path and a combination of multiple path segments respectively between the starting point and the ending point. For example, a plurality of neighbouring subsidiary contact point area may be defined on the electronic interface device with the predefined "path" such that the path of dynamic contact points may be generated during an interaction process.

Figure 11:
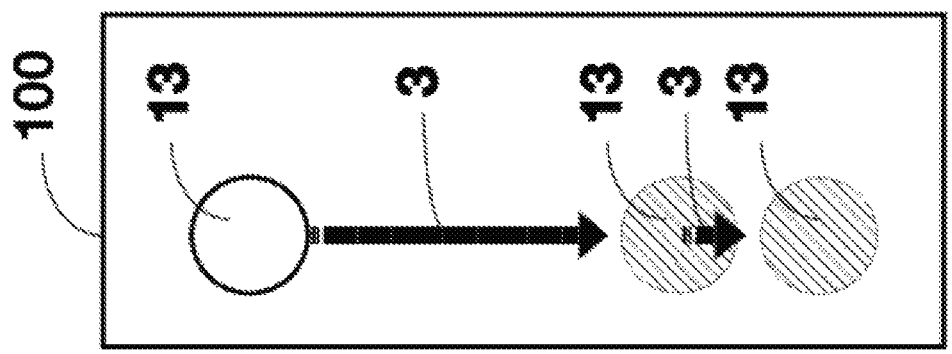
FIG. 11 is a schematic diagram showing another step in the process of verifying an object according to an embodiment of the present invention.
Figure 10:
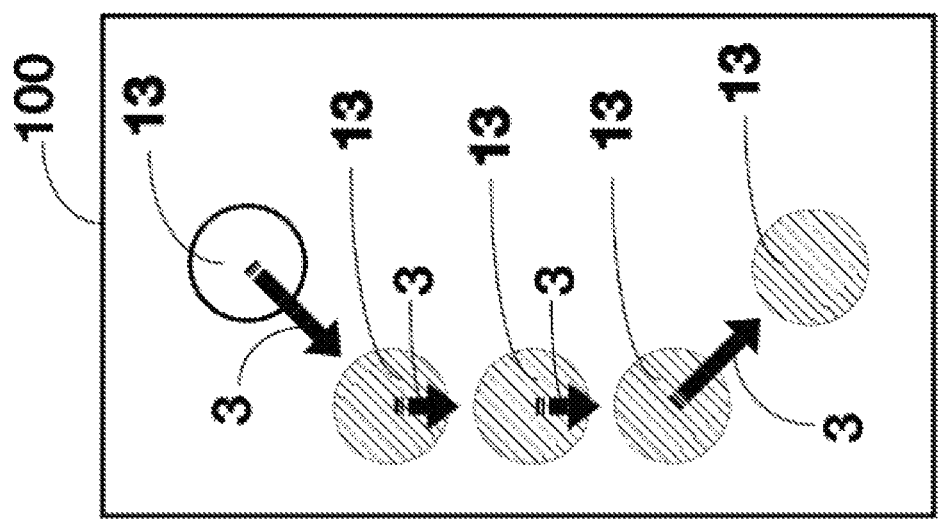
FIG. 10 is a schematic diagram showing another step in the process of verifying an object according to an embodiment of the present invention.
Figure 9:
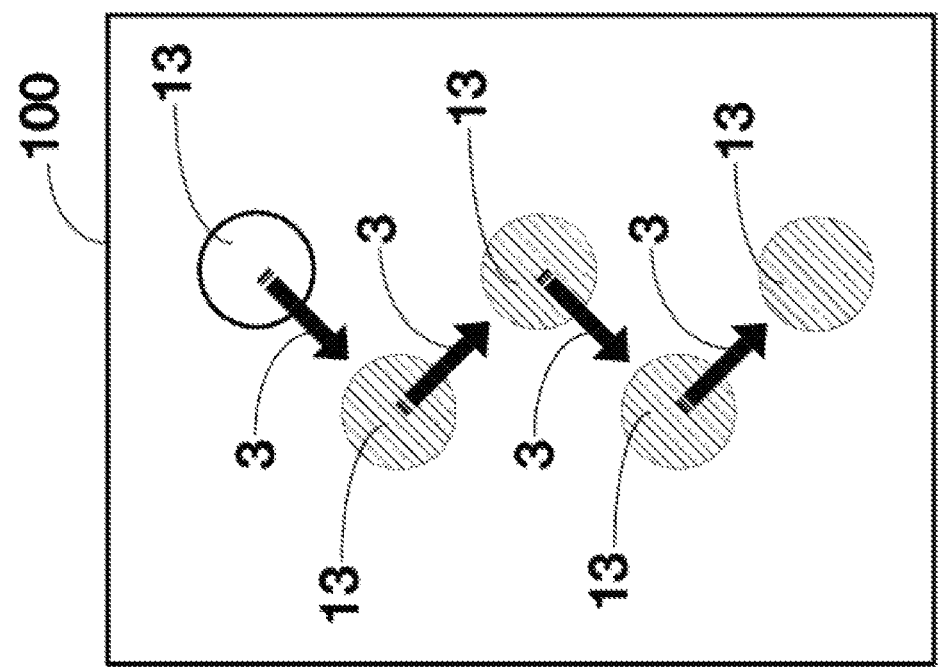
FIG. 9 is a schematic diagram showing a step in the process of verifying an object according to an embodiment of the present invention.

With reference to FIGS. 9 to 11, there is shown other examples of directional arrows 3 representing a discontinuous move of a touch point 13 from one position to another position with varied distance in-between on the touch-sensitive surface 100.

Alternatively, the TUI device includes one or more triggers each may be associated with one or more respective contact points. The dynamic contact points may include one or more of the individual contact point and the neighboring contact points including the primary and secondary contact points as discussed above.

Figure 18:
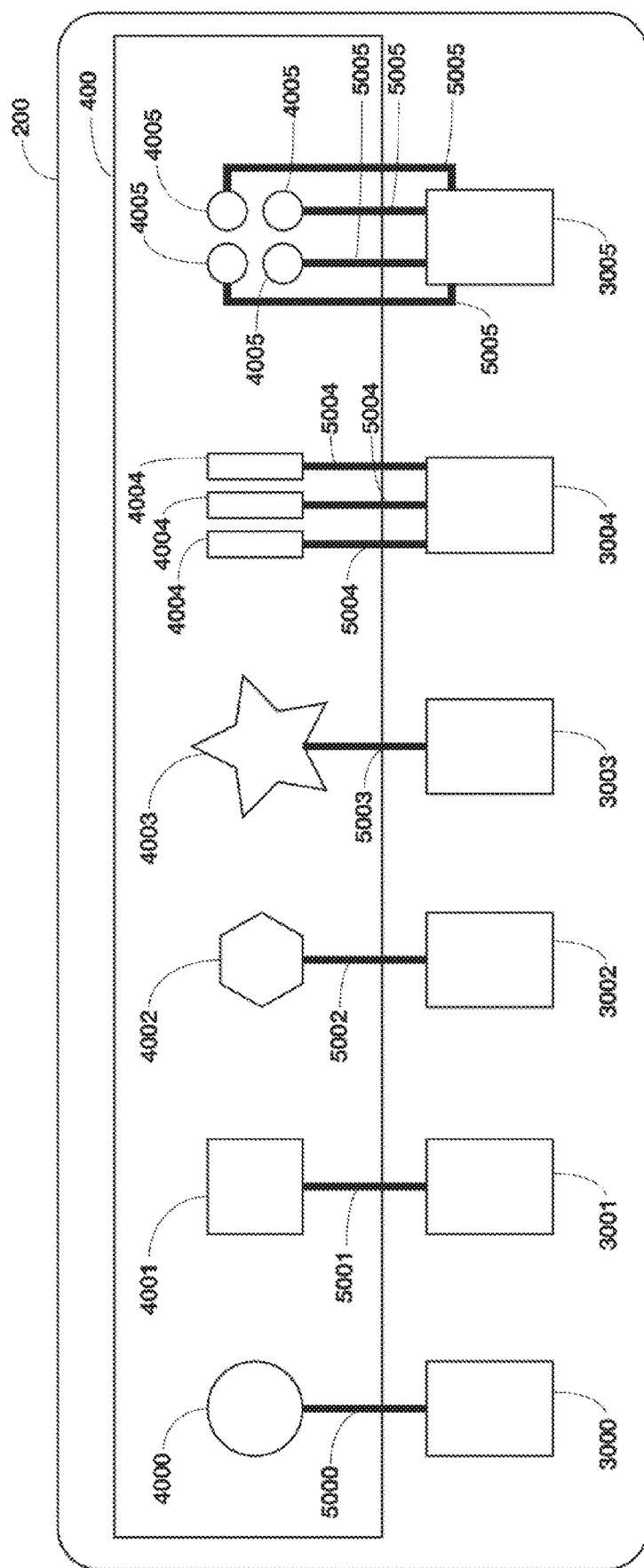
FIG. 18 is a schematic diagram showing different contacts point of an interaction medium according to an embodiment of the present invention.

A contact point area defined on the touch sensitive surface may include one or more subsidiary contact point areas as illustrated in example FIG. 18. Preferably, each of the triggers is associated with the contact point area through a bridge, such as a conductive path arranged to electrically connect the triggers with the contact point areas.

Figure 12:
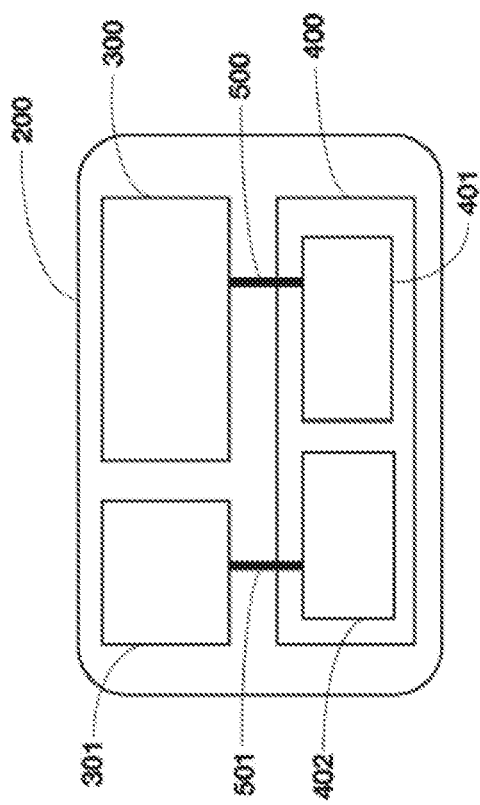
FIG. 12 is a schematic diagram showing a tangible user interface devices of another embodiment of the present invention.
Figure 13:
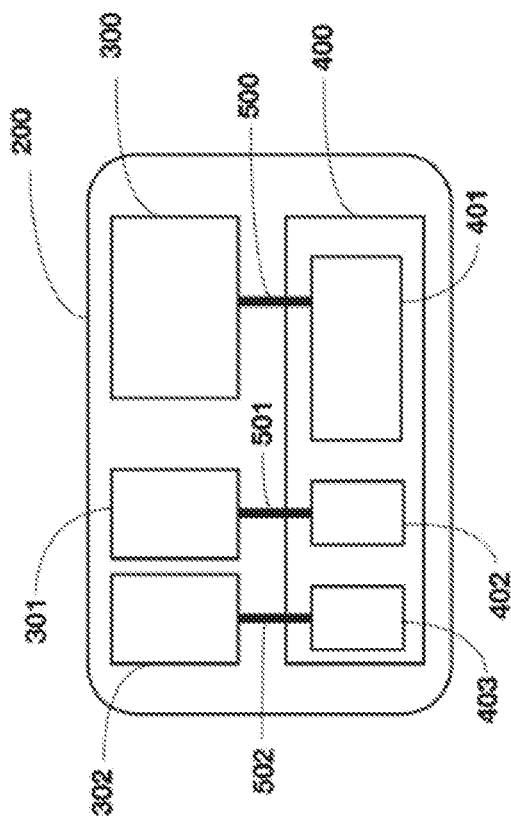
FIG. 13 is a schematic diagram showing a tangible user interface devices of yet another embodiment of the present invention.
Figure 14:
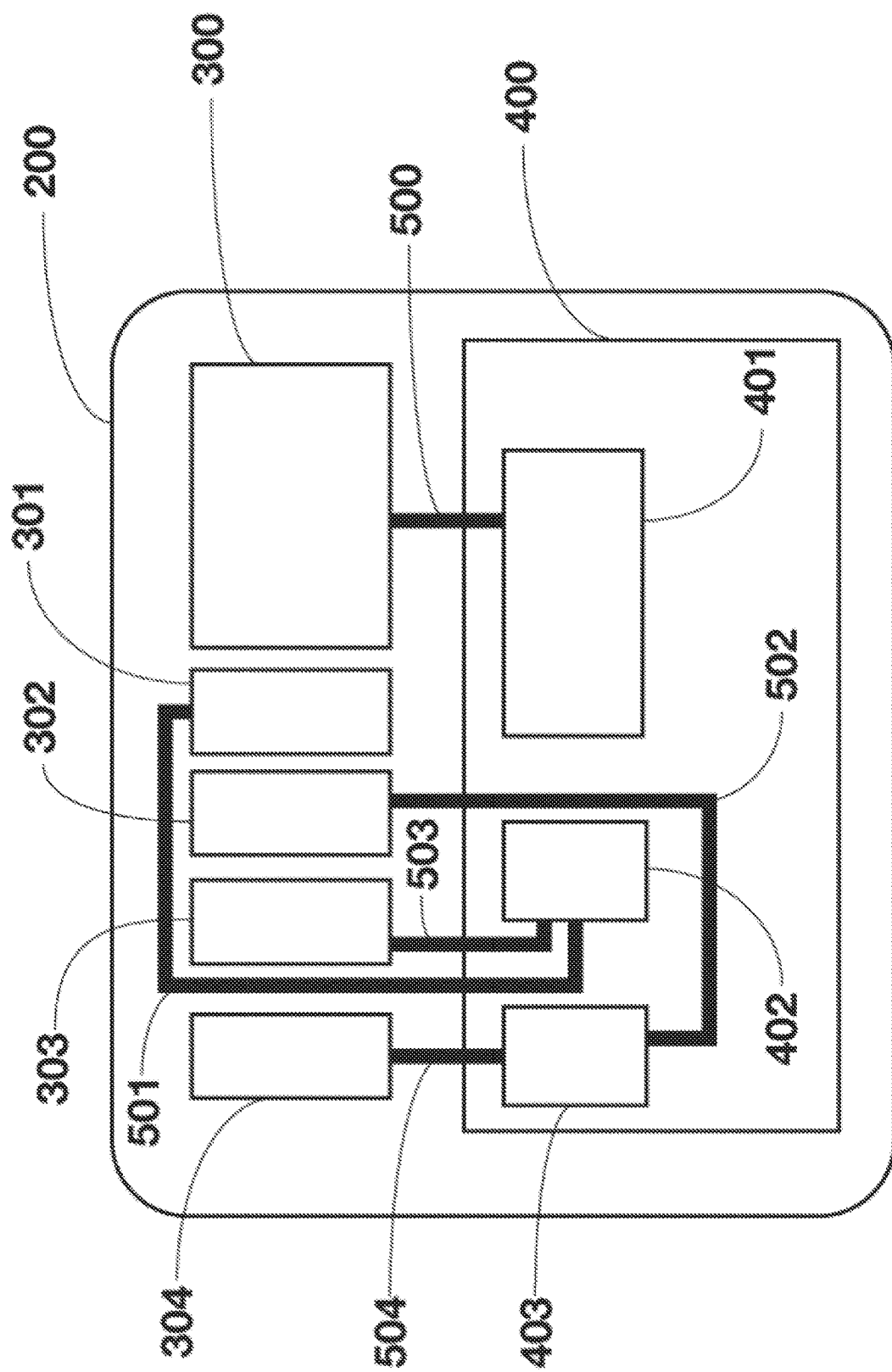
FIG. 14 is a schematic diagram showing a tangible user interface devices of an embodiment of the present invention.

With reference to FIGS. 12 to 14, the trigger may include a first trigger 300 in connection with the first contact point area 401, wherein the first trigger 300 is adapted to receive a first trigger signal so as to activate the dynamic contact points within a first contact point area 401. Preferably, the first trigger signal includes maintaining a touch contact with the first trigger 300. Dynamic contact points within a first contact point area 401 may include at least an individual contact point which should be fixed or may be considered as a reference point in the interaction verification process. Optionally, the first trigger 300 may be further arranged to active a primary contact point within a subsidiary contact point area of the first contact point area.

In this example, the contact point area 400 may include the first contact point area 401 and second contact point area 402 which may be electrically separated. The triggers can be in the form of a handle area or button areas, which may be used to activate each of the associated contact points. For example, the TUI device may be used as a controller device which includes a handle identifier and a plurality button controls, therefore the identities of the interactions may be verified. The buttons may be deactivated when upon the handle identifier is detached from the touch sensitive surface, such that only user interactions on the touch sensitive surface which are identifiable by the system may be processed.

Alternatively, the associated touch-enable computing device may be arranged to process or verify the touch points only when at least an individual contact point and a primary/secondary contact point is detected or generated on the touch sensitive surface, i.e. single touch point or multiple touch points which are not generated by the electronic interface device 200 will not be processed or verified.

Additionally, the trigger may further include a second trigger 301 in connection with one or more second contact point areas 402, wherein the second trigger 301 is adapted to receive a second trigger signal so as to activate a primary contact point within the second contact point area 402, or to move the primary contact point (previously generated by the first trigger and the first contact point area) to the secondary contact point within or adjacent to the second contact point area.

Referring to FIG. 12, an object 200 may include a handle area 300, a button area 301 associated with contact point areas 401 and 402. Handle area 300 is a trigger connected to an associated contact point area 401 with a bridge 500. Button area 301 is a trigger connected to an associated contact point area 402 with a bridge 501.

During an example operation, a user may selectively activate the contact points in the first contact point area 401 by maintaining a touch to the first trigger 300. Subsequently, the user may tap the second trigger 301 to interact with the touch sensitive surface. Based on different configurations of the electronic interface device 200, the primary contact point may be generated simultaneously with the individual contact point in response to a touch to a first trigger, or may be separately generated by providing to a first touch on the second trigger after the generation of the individual contact point by touching the first trigger. In addition, the second trigger may be used to move the primary contact point to the secondary contact point(s) within or adjacent to the second contact point area.

With reference to FIG. 13, there is shown another example of an object 200 which includes a handle area 300, two button areas 301 and 302 and a contact point area 400. Handle area 300 is a trigger connected to associated contact point area 401 with a bridge 500. Button area 301 is a trigger connected to associated contact point area 402, which comprises one or more contact points, with a bridge 501. Button area 302 is a trigger connected to associated contact point area 403 with a bridge 502.

In one example, the trigger is arranged to activate a plurality of dynamic contact points on each of the plurality of subsidiary contact point areas With reference to FIG. 14, there is shown another example of an object 200 which includes a handle area 300, four button areas 301, 302, 303 and 304 and a contact point area 400. Handle area 300 is a trigger connected to associated contact point area 401 with a bridge 500. Button area 301 is a trigger connected to associated contact point area 402 with a bridge 501. Button area 302 is a trigger connected to associated contact point area 403 with a bridge 502. Button area 303 is a trigger connected to subsidiary contact point area 402 with a bridge 503. Button area 304 is a trigger connected to subsidiary contact point area 403 with a bridge 504. When swiping from button area 301 to button area 304, contact points of the subsidiary contact point area 402 and 403 will be activated and deactivated alternately.

The touch sensitive surface may be arranged to receive input signals with an interaction medium, such as a finger or a touch pen. The interaction medium may include a specific touching area which may cover or trigger one or more trigger area defined on the touch sensitive area.

Figure 15:
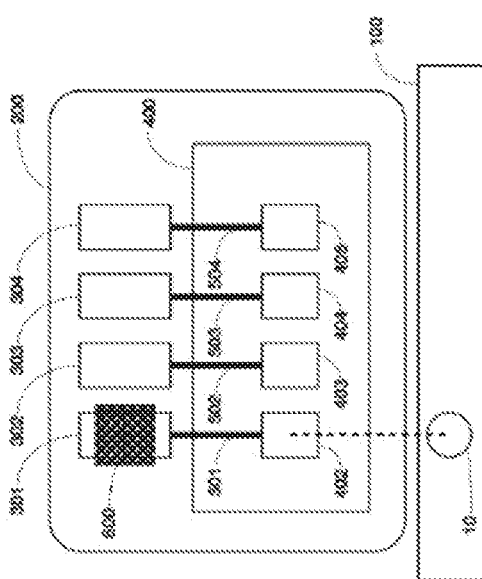
FIG. 15 is a schematic diagram showing an interaction of the tangible user interface device of FIG. 10.

With reference to FIG. 15, there is shown an interaction medium 600, which can be a finger or a specific device, is in contact with button area 301, contact points of the secondary (subsidiary) contact point area 402 on the touch-sensitive surface 100 will then be activated to generate a touch point 10.

The trigger may be further arranged to activate the one or more dynamic contact points to define a swipe movement on the plurality of subsidiary contact point areas in response to a swiping touch signal received by trigger associated with the plurality of subsidiary contact point areas.

Preferably, the subsidiary contact point areas 402, 403, 404 and 405 are positioned adjacent to each other, such that the trigger may activate a combined dynamic contact point within or adjacent to one or more of the plurality of subsidiary contact point areas. In addition, the triggers associated with each of the subsidiary contact points may also be closely arranged such that a single touch may be used to trigger two adjacent subsidiary contact point areas. For example, a user may touch both triggers 301 and 302 at the same time such that touch signal may be transmitted to the subsidiary contact point areas 402 and 403 simultaneously, so as to generate a combined touch point therebetween.

Figure 16:
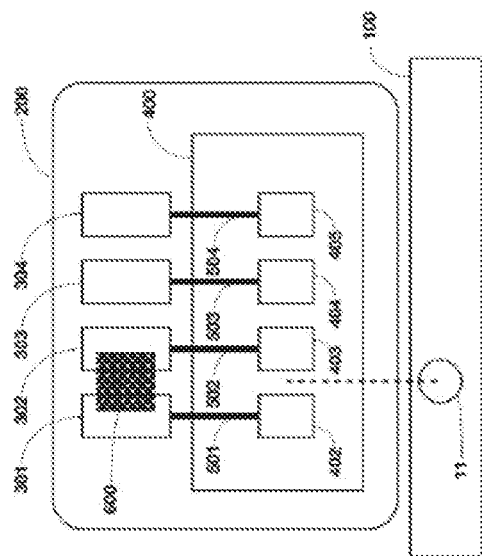
FIG. 16 is a schematic diagram showing another interaction of the tangible user interface device of FIG. 10.

Preferably, the at least one secondary contact point is defined within the second contact point area. With reference to FIG. 16, there is shown an interaction medium 600, which can be a finger or a specific device, is in contact with button areas 301 and 302, contact points of the subsidiary contact point area 402 and 403 on the touch-sensitive surface 100 will then be activated to generate a combined touch point 11. When two or more closely-packed contact points are activated and in contact with the touch-sensitive surface, a combined touch point is then generated.

Figure 17:
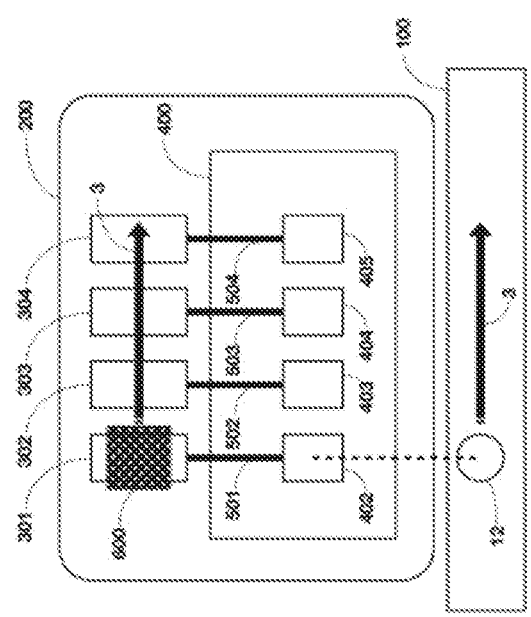
FIG. 17 is a schematic diagram showing yet another tangible user interface devices of an embodiment of the present invention.

With reference to FIG. 17, there is shown a directional arrow 3 representing a move of the touch point 12, when an interaction medium 600, which can be a finger or a specific device, is swiping from button area 301 to button area 304. Contact points of the subsidiary contact point area 402, 403, 404, 405 on the touch-sensitive surface 100 are activated subsequently to generate a moving touch point 12. Interaction medium 600 activates a subsidiary contact point area by direct contact and deactivates it by withdrawal. Therefore, the first and the second triggers may trigger a swipe movement on the contact point area in response to a touch signal of swiping across the first and the second triggers.

The contact point area may include a single or a plurality of subsidiary contact point areas. With reference to FIG. 18, there is shown examples of subsidiary contact point areas 4000, 4001, 4002, 4003, 4004 and 4005 in different shapes and patterns of contact points and with one or more bridges 5000, 5001, 5002, 5003, 5004 and 5005 connect to button areas 3000, 3001, 3002, 3003, 3004 and 3005.

Preferably, each subsidiary contact point area can be associated with or connected to one or more triggers. A trigger may be touched in order to activate one or more contact points of the subsidiary contact point area. The subsidiary contact point areas may be proximately or adjacently arranged so as to generate a combined touch point. Alternatively, the subsidiary contact point areas may generate multiple contact points on the touch sensitive surface if the subsidiary contact point areas are sufficiently separated.

When the individual contact point is activated, a current is induced, and the point becomes energised. As the energised contact point is in contact with the touch-sensitive surface, it simulates a touching action on the touch sensitive surface, and the touch sensitive surface will record a signal of a fixed touch point being touched. Alternatively, the trigger may activate the one or more dynamic contact points in response to receiving a touch signal.

With reference to FIG. 19, there is shown an alternative embodiment of an electronic interface device 200 on a touch-sensitive surface 100. In this example, the trigger area 300 is associated with contact point area 401. Contact point area 401 includes two contact points, i.e. individual contact point and primary contact point of the group of neighbouring points, facing down the touch-sensitive surface 100. Trigger area 301 is associated with contact point area 402. Contact point area 402 includes a secondary contact point of the group of neighbouring points, facing down the touch-sensitive surface 100.

With reference to FIG. 20, there is shown another example embodiment of an electronic interface device 200 on a touch-sensitive surface 100. In this example, the trigger area 300 is associated with contact point area 401. Contact point area 401 includes one contact points only, i.e. individual contact point, facing down the touch-sensitive surface 100. For each contact point area 402/403/404/405, it includes one contact point of the group of neighbouring points, facing down the touch-sensitive surface 100. Given that the first touch signal remains active in contact point area 401, user presses, taps or swipes the trigger 301/302/303/ 304 to activate/deactivate the associated contact point area to generate the second or more touch signals to form one or more touch actions.

Figure 21:
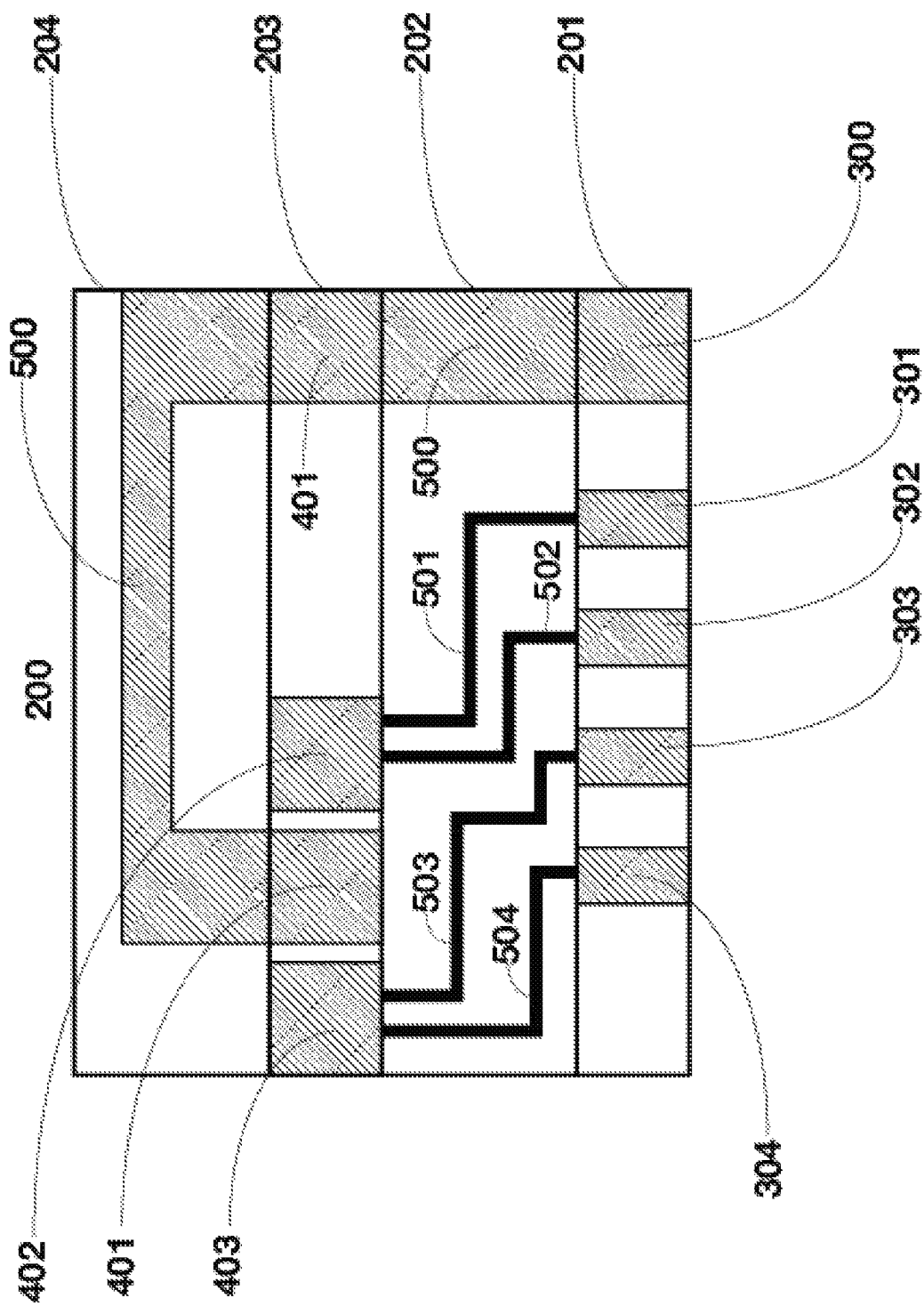
FIG. 21 is an unfolded view of an electronic interface device in accordance with another alternative embodiment of the present invention.

With reference to FIG. 21, there is shown another example of an electronic interface device 200. The surfaces of the electronic interface device 200 are provided as a top face 201, a bottom face 203, a left side face 202 and a right side face 204. Bottom face 203 is the face contacting the touch-sensitive surface 100. In this example, the bridges 500/501/502/503/504 are arranged on the left or the right side face 202/204, with the user intractable buttons/triggers 300/301/302/303/304 provided on the top face 201. By touching the buttons 300/301/302/303/304, the associated contact points will be generated on the touch sensitive surface 100 via the bridges 500/501/502/503/504 and contact point areas 401/402/403.

The TUI device may further active other contact points according to the input it received or its program. When one or more contact points in the group of neighbouring contact points is/are activated and energised, the TUI simulate a movement or multi-touch gesture. As these contact points are in contact with the touch-sensitive surface, a moving touch point is generated on the surface.

In the above embodiments, the electronic interface device 200 is a passive device with only the conductive materials provided on the surfaces of the device. Alternatively, the electronic interface device 200 may be an active device comprises a processor to generate different patterns of energised contact points in response to user interactions. The TUI device may alter its patterns of energised contact points in real time or dynamically based on the input to the TUI interface. Hence, the trigger is of the TUI device is adapted to activate one or more dynamic contact points on the contact point area to simulate one or more touch action of the touch sensitive surface.

When the touch sensitive surface senses the patterns of energised contact points, it may induce the touch sensitive surface associated computer system to recognise the identity of the touch action is presenting at that time.

When the TUI device changes its pattern of energised contact points, the touch sensitive surface associated computer system will recognise the identity of the touch action has changed as well.

The system for verifying the touch action or user interaction comprises a touch sensitive surface associated with a processor to carry out the process of verifying the interaction.

The process or method of verifying an interaction on a touch sensitive surface of an embodiment of the present invention, comprises the steps of: detecting an individual contact point and a primary contact point; evaluating a distance of the individual contact point and the primary contact point; evaluating one or more of angles, orientations, alignment of a line formed by of the individual contact point and the primary contact point; thereby determining the general identity of a touch action.

The TUI device will have an individual contact point and a primary contact point activated, in which the first and second touch point are generated, corresponding to the individual contact point and a primary contact point being activated.

In yet another embodiment, the TUI device with the touch sensitive surface may be operated and has a number of contact points activated or energised. The TUI device may cut off the current of the contact points and hence reset its state. The TUI device may generate a new set of contact points by activating a new individual contact point and primary contact point.

When the touch sensitive surface detects a simulated touch signal of the individual contact point and primary contact point, the associated processor will evaluate the distance, and one or more of the angle between the individual and primary touch points in order to determine the position, orientation, alignment.

With the information, the associated processor may search the identity database and find the referencing identity for the pattern of contacts point the TUI device presenting.

In one embodiment, identity is merely a general reference to a type of the item instead of a specific item. The processor will further require more information from the TUI device in order to determine the specific species of the item.

The TUI device may then further carry out a routine of activating and/or deactivating the third or more contact points. This drives the second touch point moving along a path or in a pattern on the touch-sensitive surface.

When the touch sensitive surface records the path or pattern, its associated process can evaluate through one or more of the change in position of the second touch point, the angle from the first touch point, last and current positions of second touch point further determine the pointing direction of an object and its unique identity, granting users to perform further interactions.

These embodiments may be advantageous in that the TUI device may be used in applications such as, but not limited to, peripheral devices, controllers, gadgets, toys and games, therapy and assistive devices, keys to unlock items, identity tokens, security tokens and stampers.

The advantages of the TUI device, system and method include, but not limited to, multi-identity interaction, tactile sensation and intuitive experience, creative and imaginative play for toys and games, precise and accurate control for peripheral devices, controllers, gadgets and therapy and assistive devices, privacy protection and security for keys to unlock items, identity tokens, and security tokens.

Sensing technology of touch-sensitive surfaces of an embodiment of the present invention include, but not limited to, capacitive sensing, infrared sensing, and resistive sensing.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electronic interface device for interacting with a touch sensitive surface, comprising a trigger and a contact point area associated with the touch sensitive surface, wherein the trigger is adapted to activate and/or deactivate one or more dynamic contact points defined within or adjacent to the contact point area to simulate one or more touch action of the touch sensitive surface, wherein the one or more dynamic contact points comprise at least an individual contact point and a primary contact point, and wherein the trigger includes a first trigger in connection with a first contact point area, wherein the first trigger is adapted to receive a first trigger signal so as to activate the individual contact point within the first contact point area.

2. The electronic interface device according to claim 1, wherein the one or more dynamic contact points defines a pattern.

3. The electronic interface device according to claim 1, wherein the trigger is arranged to selectively connect to the touch sensitive surface.

4. The electronic interface device according to claim 1, wherein the one or more dynamic contact points further comprise at least two neighboring contact points.

5. The electronic interface device according to claim 4, wherein the at least two neighboring contact points include the primary contact point and at least one secondary contact point.

6. The electronic interface device according to claim 1, wherein the trigger is associated with the contact point area through a bridge.

7. The electronic interface device according to claim 1, wherein the electronic interface device includes a tangible interface associated with an intangible interface defined on the touch sensitive surface.

8. The electronic interface device according to claim 5, wherein the first trigger is further arranged to active the primary contact point within the first contact point area.

9. The electronic interface device according to claim 8, wherein the trigger further includes a second trigger in connection with a second contact point area, wherein the second trigger is adapted to receive a second trigger signal so as to move the primary contact point to the secondary contact point within or adjacent to the second contact point area.

10. The electronic interface device according to claim 5, wherein the trigger further includes a second trigger in connection with a second contact point area, wherein the second trigger is adapted to receive a second trigger signal so as to activate the primary contact point within the second contact point area.

11. The electronic interface device according to claim 10, wherein the second trigger is further arranged to move the primary contact point to the secondary contact point within or adjacent to the second contact point area.

12. An electronic interface device for interacting with a touch sensitive surface, comprising a trigger and a contact point area associated with the touch sensitive surface, wherein the trigger is adapted to activate and/or deactivate one or more dynamic contact points defined within or adjacent to the contact point area to simulate one or more touch action of the touch sensitive surface, wherein the contact point area includes a plurality of subsidiary contact point areas, and wherein the trigger is further arranged to activate the one or more dynamic contact points to define a swipe movement on the plurality of subsidiary contact point areas in response to a swiping touch signal received by the trigger associated with the plurality of subsidiary contact point areas.

13. The electronic interface device according to claim 12, wherein the electronic interface device includes a tangible interface associated with an intangible interface defined on the touch sensitive surface.

14. The electronic interface device according to claim 12, wherein the trigger is arranged to activate a plurality of dynamic contact points on each of the plurality of subsidiary contact point areas.

15. The electronic interface device according to claim 12, wherein the trigger is arranged to activate a combined dynamic contact point within or adjacent to one or more of the plurality of subsidiary contact point areas.

16. The electronic interface device according to claim 12, wherein the trigger is arranged to selectively connect to the touch sensitive surface.

17. An electronic interface device for interacting with a touch sensitive surface, comprising a trigger and a contact point area associated with the touch sensitive surface, wherein the trigger is adapted to activate and/or deactivate one or more dynamic contact points defined within or adjacent to the contact point area to simulate one or more touch action of the touch sensitive surface, wherein the touch sensitive surface comprises a capacitive material or conductor, and wherein the trigger is adapted to activate the one or more dynamic contact points in response to receiving a touch signal.

18. The electronic interface device according to claim 17, wherein the touch sensitive surface arranged to electrically communicate with the trigger.

19. The electronic interface device according to claim 17, wherein the electronic interface device includes a tangible interface associated with an intangible interface defined on the touch sensitive surface.

20. An electronic interface device for interacting with a touch sensitive surface, comprising a trigger and a contact point area associated with the touch sensitive surface, wherein the trigger is adapted to activate and/or deactivate one or more dynamic contact points defined within or adjacent to the contact point area to simulate one or more touch action of the touch sensitive surface, wherein the touch sensitive surface comprises a capacitive material or conductor, and wherein a contact point is activated by inducing a current to the capacitive material or conductor of the contact point.

21. The electronic interface device according to claim 20, wherein the electronic interface device includes a tangible interface associated with an intangible interface defined on the touch sensitive surface.

22. A method for interacting with a touch sensitive surface, comprising the steps of:
    defining a contact point area associated with the touch sensitive surface, wherein the contact point area connected to a trigger including a first trigger;
    receiving a first trigger signal on the first trigger so as to activate an individual contact point within a first contact point area, wherein the first trigger is in connection with the first contact point area; and
    activating and/or deactivating one or more dynamic contact points defined within or adjacent to the contact point area to simulate one or more touch action of the touch sensitive surface; and
    either activating a primary contact point within the first contact point area associated with the first trigger;
    or activating the primary contact point within a second contact point area associated with a second trigger upon receiving a second trigger signal on the second trigger.

23. The method for interacting with a touch sensitive surface according to claim 22, further comprising the step of:
    activating a combined dynamic contact point within or adjacent to one or more of a plurality of subsidiary contact point areas.

24. The method for interacting with a touch sensitive surface according to claim 22, further comprising the step of moving the primary contact point to a secondary contact point within or adjacent to the second contact point area upon receiving a second trigger signal.

25. A method for interacting with a touch sensitive surface comprising the steps of:
    defining a contact point area associated with the touch sensitive surface, wherein the contact point area is connected to a trigger;
    receiving a trigger signal by the trigger;
    activating and/or deactivating one or more dynamic contact points defined within or adjacent to the contact point area to simulate one or more touch action of the touch sensitive surface; and
    activating the one or more dynamic contact points to define a swipe movement on a plurality of subsidiary contact point areas of each of the contact point areas in response to a swiping touch signal received by the trigger associated with the plurality of subsidiary contact point areas.

26. The method for interacting with a touch sensitive surface according to claim 25, further comprising the step of activating a combined dynamic contact point within or adjacent to one or more of the plurality of subsidiary contact point areas.

27. A method of verifying an interaction on a touch sensitive surface, comprising the steps of:
    detecting a dynamically generated individual contact point, and a dynamically generated primary contact point, a dynamically generated secondary contact point;
    evaluating one or more of distances, angles, orientations, and alignment of a line formed by of the individual contact point, the primary contact point and the secondary contact point; and
    thereby determining a specific identity of a touch action.

28. A method according to claim 27, wherein the step of determining the identity of the touch action comprising the step of: searching an identity database for a referencing identity which matches one or more of the distance, angles, orientations, and alignment of a line formed by of the individual contact point, the primary contact point and/or the secondary contact point.

29. A method according to claim 27, wherein the one or more contact points are dynamically generated by an electronic device including the touch sensitive surface according to claim 1.

30. A method according to claim 27, wherein the one or more contact points are dynamically generated by an electronic device including the touch sensitive surface according to claim 12.

31. A method according to claim 27, wherein the one or more contact points are dynamically generated by an electronic device including the touch sensitive surface according to claim 17.

32. A method according to claim 27, wherein the one or more contact points are dynamically generated by an electronic device including the touch sensitive surface according to claim 20.

* * * * *